United States Patent [19]
Prill

[11] 3,995,272
[45] Nov. 30, 1976

[54] SIGNAL CONDITIONING CIRCUIT

[75] Inventor: Robert S. Prill, Parsippany-Troy Hills, N.J.

[73] Assignee: The Singer Company, Little Falls, N.J.

[22] Filed: Mar. 10, 1975

[21] Appl. No.: 556,699

[52] U.S. Cl. .......................... 343/106 R; 324/78 D; 325/325; 328/136
[51] Int. Cl.² ........................................ G01S 1/44
[58] Field of Search ............... 343/106 R; 324/78 D; 328/136; 325/325

[56] References Cited
UNITED STATES PATENTS

| | | | |
|---|---|---|---|
| 3,714,657 | 1/1973 | Lapeyre | 343/106 R |
| 3,836,864 | 9/1974 | Jezo | 343/106 R |
| 3,852,671 | 12/1974 | Risley | 325/325 |
| 3,921,076 | 11/1975 | Currie | 343/103 |

*Primary Examiner*—Maynard R. Wilbur
*Assistant Examiner*—Richard E. Berger
*Attorney, Agent, or Firm*—T. W. Kennedy

[57] ABSTRACT

A signal conditioning circuit for a fixed rise time, variable amplitude receiving system (TACAN) that digitizes the time of arrival and samples the pulse amplitude at the receiver's last intermediate frequency (IF) stage before video detection. The time of arrival measurement is performed by counting a fixed number of successive threshold crossings of the IF carrier, utilizing a pair of comparators having two inputs each. One input of each comparator is coupled to the IF stage. The other input of each comparator is coupled to a point of reference potential, one comparator being referenced to ground and the other being coupled to a small positive threshold voltage level. The output of the grounded comparator is delayed, and the delayed output is used as a clock signal to the remaining circuitry. The output of the threshold comparator provides data pulses, one data pulse being generated each time that the IF signal goes above the threshold value. The data pulses, along with the clock pulses, are applied to an up down shift register which acts as a digital flywheel. The output of the digital fly-wheel enables and disables a counter.

Two signal conditioning circuits are described, one which extracts time information, and one which extracts amplitude information from a fixed rise time, pulse-amplitude modulated carrier as is found in a typical TACAN receiver at the last intermediate frequency (IF) stage. The time of arrival of the leading edge 50% voltage point is determined in real time with virtually zero delay, and therefore does not rely on conventional approaches which must first wait until the full unknown amplitude of the pulse is determined before a 50% detector is enabled. The technique is based on the fact that there are a fixed number of cycles of IF carrier under the leading edge of the pulse regardless of its amplitude and that therefore the 50% voltage point is determined by counting in an electronic counter a fixed number of "consecutive" cycles that exceed a pre-determined noise threshold as determined by a comparator set at that threshold. The technique operates on the signal one stage before conventional video detection. Erroneous false alarm and false dismissal threshold crossings are rejected by a digital up-down shift register which acts as a fly-wheel. The peak amplitude of the IF pulse-amplitude modulated carrier is detected, sampled, amplified, and buffered in one efficient circuit. The detection function is performed by charging a capacitor, which is isolated from the raw IF by a differential amplifier stage, up to a voltage proportional to each successive carrier cycle peak by a closed loop means. Since the capacitor can only charge in one direction, it charges up to a voltage proportional to the most positive peak of the pulse-amplitude modulated carrier, with a fixed amount of rate limiting for noise immunity. Two logic signals, a Track/Hold command and a Dump command are used to respectively hold the peak amplitude for subsequent analog to digital conversion and digital signal processing, and to reset the detector prior to encoding another pulse.

19 Claims, 7 Drawing Figures

SIGNAL CONDITIONING CIRCUIT

BACKGROUND OF THE INVENTION

1. Field of the Invention

This invention relates to a signal conditioner which operates on fixed rise time, pulse-amplitude modulated carriers as is found at the last IF stage of a TACAN receiver, and, in particular, to apparatus that determines the time of arrival of the 50% leading edge amplitude point of a pulse-amplitude modulated carrier without introducing any delay and before conventional video detection smearing. A second part of the apparatus uniquely performs two additional functions, that of video detection, and that of sampling and holding the peak amplitude of the pulse-amplitude modulated carrier for subsequent analog to digital conversion and digital signal processing. Accordingly, it is a general object of this invention to provide new and improved apparatus of such character.

2. Description of the Prior Art.

Several technical disadvantages of prior-art leading edge 50% point time of arrival detection schemes of fixed rise-time pulse-amplitude modulated carriers are:

First, conventional approaches introduce a fixed lag in outputting the 50% point time of arrival signal. The minimum lag in the conventional approach is usually equal to one-half the rise time of the envelope of the pulse, that is, the 50% point time of arrival can not be outputted until the peak of the pulse is first determined.

Secondly, important information, the carrier is stripped away via a video detector which effectively introduces smearing and degradation.

Thirdly, the leading edge of a video detected carrier has an infinite number of slopes depending on the magnitude of the amplitude of the pulse modulation causing dc off-set voltages of comparators to introduce different 50% point leading-edge timing errors as a function of slope, i.e., pule amplitude.

Prior to this invention, all front ends (or signal conditioners), to applicant's knowledge, operated in the analog domain, that is, historically, utilizing electromechanical servos or analog and phased locked loops. Prior art devices were not concerned with digitizing the signal, but, instead, were concerned with operation in the analog domain.

SUMMARY OF THE INVENTION

An object of this invention is to define a signal-conditioning circuit operating on pulse-amplitude modulated carrier signals that provide outputs compatable with modern digital signal processing techniques.

Another object of the invention is to define a means for determining the leading edge 50% amplitude point of a fixed rise time pulse-amplitude modulated carrier without introducing traditional fixed delays into the system.

Another objective of the invention is to define how a fixed number of raw cycles of carrier can be counted to determine the 50% amplitude point of a fixed rise time signal regardless of its amplitude.

Another object of the invention is to define how spurious carrier signal noise is rejected to reduce erroneous false alarm, and false dismissal errors in a solid state up-down shift register acting as a digital fly-wheel.

Another object of the invention is to show how the raw carrier signal acts as both leading edge data, and clock or timing data and thus eliminates complex phase lock loop synchronization problems.

Another objective of the invention is to show how the clock and data lines are used to validate outputted time of arrivals based on pulse width criteria of the pulse-amplitude modulated IF carrier.

Still another object of the invention is to define a single closed loop efficient circuit to perform the function of video detection, sample and hold, amplification, and buffering.

In accordance with one embodiment of this invention, a unique means of measuring the time of arrival of the leading edge 50% point of a fixed rise time pulse-amplitude modulated carrier as is found at the last IF stage of a TACAN receiver is documented. It outputs TOA information with zero delay, and therefore does not rely on conventional approaches which must first wait until the full amplitude of the pulse occurs before a 50% detector is enabled. The information sensing to do this "real time leading edge 50% point detection" is gathered with two comparators acting as a data generator and a clock generator which are connected directly to the raw IF signal down stream (before) from conventional video detector outputs. One comparator, the data generator, is referenced to a slight positive bias voltage just above the noise threshold. The second comparator, the clock generator, is biased at ground potential of zero bias. In operation, as a potential pulse begins to emerge out of the IF noise, cycles of the carrier will begin to exceed the slight positive threshold voltage reference at the data comparator and it will therefore be tripped. A fixed number of "consecutive" trips of this comparator (where the term "consecutive" is determined by the clock generator comparator which trips on every cycle of the carrier because it is referenced to zero bias) determines the time of arrival of the leading edge 50% amplitude point regardless of the amplitude of the fixed rise time pulse because, regardless of the amplitude, there are always a fixed number of cycles of carrier under the leading edge. Since noise can cause erroneous false alarm and false dismissal data threshold crossings, digital filtering in the form of a two bit up-down shift register act as a fly-wheel rejecting erroneous single threshold crossing false alarms, and gliding past a false dismissal (missing) threshold crossing when two or more successive threshold crossings have been detected.

The primary advantages of this detection scheme, compared to conventional approaches, are:

Real time output of leading edge 50% point, i.e., not a delayed output as in conventional approaches.

Comparators always see quasi-fixed rise times, i.e., the carrier, not the envelope of the carrier, as in conventional approaches, regardless of the modulation level.

In accordance with the same embodiment of this invention, a unique means of detecting and sampling the peak of the pulse amplitude modulated carrier is described.

BRIEF DESCRIPTION OF THE DRAWINGS

Other objects, advantages, and features of this invention will become more apparent from a reading of the following specification, when read in conjunction with the accompanying drawings, in which:

FIG. 2 shows, in block diagram form, the important functional parts of this invention, and the functional interrelationship between major parts. The bottom half of the figure depicts the time of arrival detector circuitry which includes three sub parts, the comparator sensors, the up-down shift register fly-wheel, and the counter-decoder. The top half of the figure depicts the closed loop pulse peak detector/sampler circuitry, and its associated analog to digital converter. The direction of information flow between the bottom and top halves of the figure are indicated by arrow heads.

DESCRIPTION OF A PREFERRED EMBODIMENT

With this invention, it is desired to achieve economies in size of necessary hardware, and, in order to obtain such desideratum, it is desired to measure the time of arrival and the amplitude of the TACAN signal and to transform it into digital form as quickly as possible.

This invention utilizes the measurement of the time of arrival directly from the IF stage, and not from the video stage as heretofore in the prior art. The raw IF is treated by counting the cycles of the carrier above a threshold value and by clocking them in a timed manner into a logic circuitry. When eight cycles of the carrier are counted, with eight consecutive threshold crossings of the intermediate frequency, eight consecutive pulses are generated. The eighth generated pulse, utilizing an 8.5 megahertz IF, corresponds to the 50% amplitude portion of the pulse. The advantage of this scheme is that the rise time of each cycle of the IF carrier is fixed regardless of variations in amplitude due to modulation.

In this invention, a time of arrival measurement can be made simply by counting N cycles of the threshold crossing of the 8.5 megahertz IF carrier, where normally N is equal to 8.

Figure 1A:
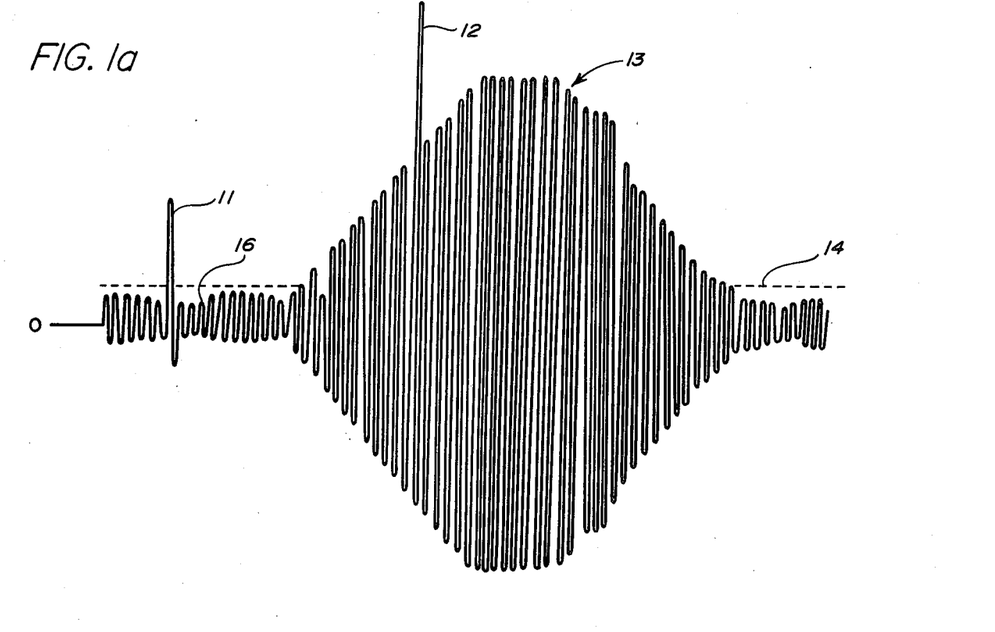
FIG. 1a depicts a typical fixed rise time, pulse-amplitude modulated IF TACAN carrier signal pulse as displayed on an oscilloscope. It shows an abnormal spurious cycle of carrier noise 11, false alarm, prior to the actual beginning of the valid pulse; an abnormal suppressed cycle of carrier due to noise during the pulse, false dismissal; and an abnormally large cycle of carrier which might yield an erroneous amplitude determination during the pulse.
Figure 1B:
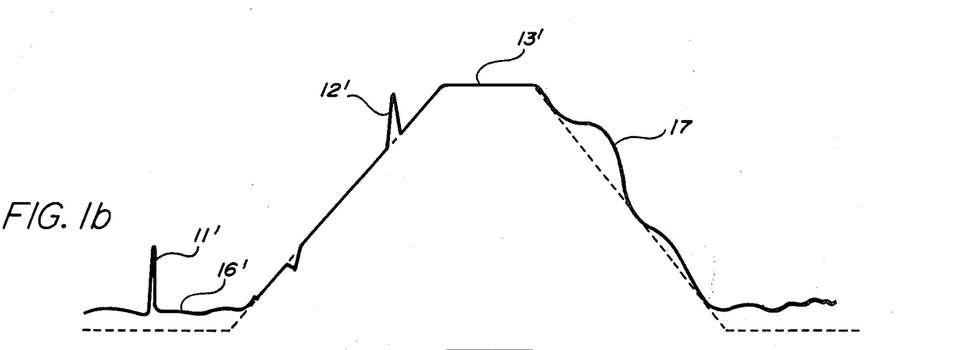
FIG. 1b shows a pictorial representation of the IF signal after treatment by a conventional video detection circuit.
Figure 1C:
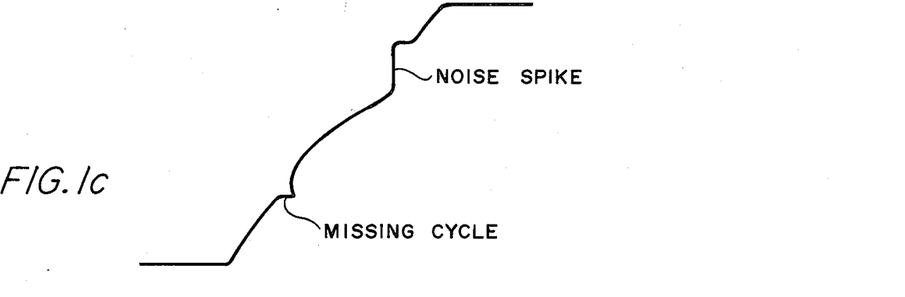
FIG. 1c shows a pictorial representation of the pulse peak detector/sampler output as displayed on an oscilloscope.

In accordance with one embodiment of this invention, apparatus for detecting the leading edge 50% point time of arrival of a fixed rise time signal without introducing fixed bias delays into the system and a means to sample its peak amplitude is set forth, wherein the signal is received in the form of a plurality of cycles of a pulse-amplitude modulated 8.5 MHz carrier signal, FIG. 1a, as is outputted from a typical IF stage of a TACAN receiver.

Figure 2:
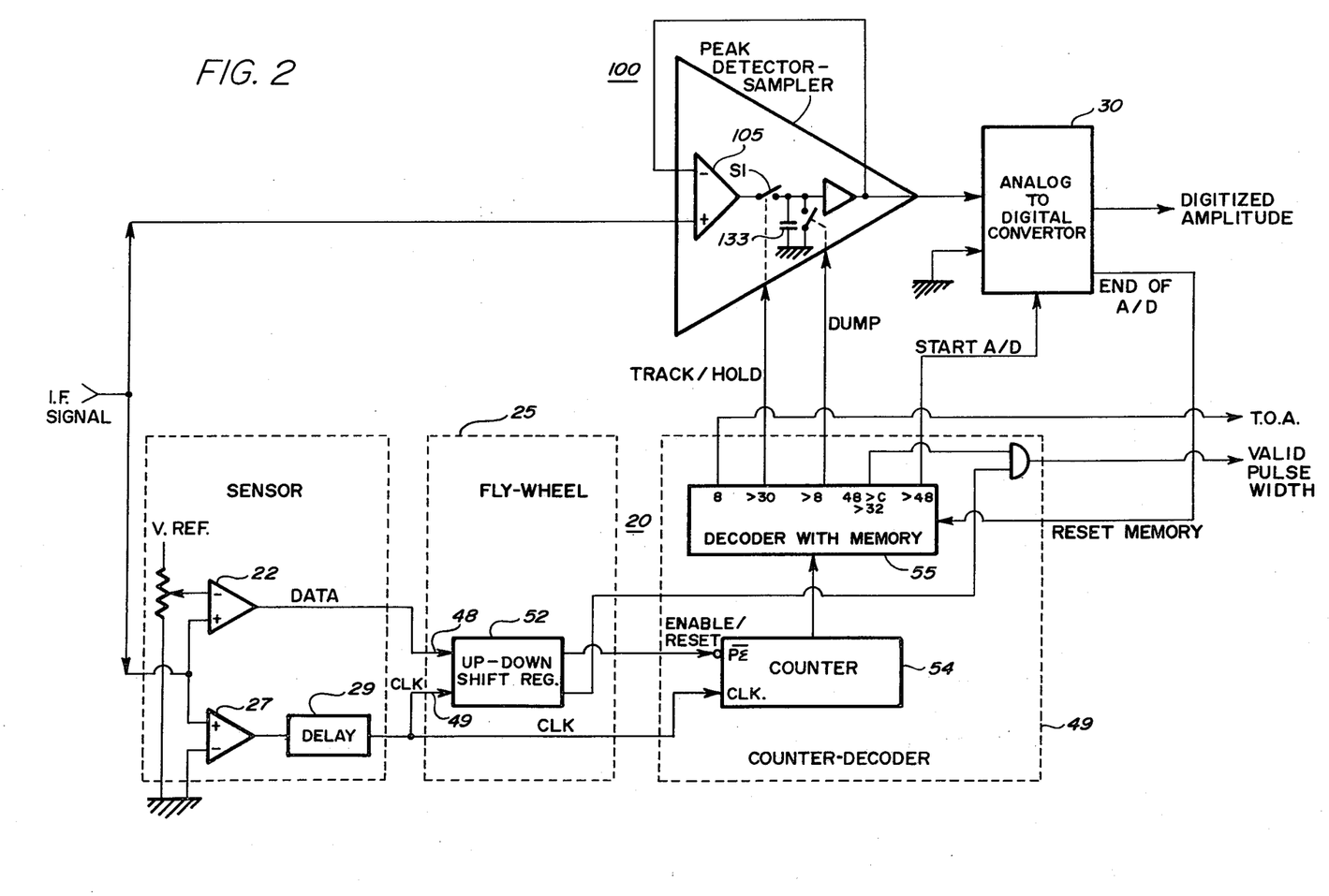

Two circuits are connected to the raw IF signal, FIG. 2, the time of arrival (TOA) detector 20, and the peak detector/sampler circuit 100.

The TOA detector 20 includes essentially three basic parts, comparator sensors 22, 27, up-down shift register fly-wheel logic 25, and a digital counter and decoder 49.

The comparator sensors 22, 27 are connected directly to the raw IF signal, one 27 is referenced to ground, the other 22 to a slight positive voltage just above the noise level of the system. Their functions are to infinitely clip the IF analog carrier about their respective predetermined threshold voltages (ground, and some slight positive voltage) and provide as output one of two logic levels each. The comparator 22, referenced to a positive threshold, acts as the data generator. The comparator 27, referenced to ground, acts as the clock generator. Since the function of the clock generator comparator is to clock or strobe data bits generated by the data comparator into logic, it is necessary to delay the clock generator comparator output by approximately 90 degrees of the carrier by means 29, so that the clock (strobe) will essentially occur when the carrier is at or very near its instantaneous peak amplitude. Since the IF frequency of a typical TACAN receiver is fixed at 8.5 MHz, a fixed delay of: $d = \frac{1}{4} (1/f) \doteq 29 \times 10^{-9}$ sec. or 29 Nanoseconds is used in series with the clock comparator output to strobe the data into the up-down shift register fly-wheel logic 25.

The digital fly-wheel 25 accepts data and clock pulses from the data and clock generator circuits just described. During the period when only noise is present (no data present), only the clock comparator 27 makes transitions since no carrier cycles exceed the predetermined positive threshold value and, therefore, logic "zeros" are clocked into the up-down shift register fly-wheel 25. As a pulse "begins to emerge" (FIG. 1a), carrier cycles exceed the pre-set positive threshold and thus trip the data comparator 22, and the delayed clock strobes a logic "one" emanating from the data comparator 22 into the first location 50 of an up-down shift register. Since this may be a spurious noise threshold crossing, see FIG. 1a point 11, no output signifying that a potentially valid "pulse" is emerging is outputted. Based on the signal to noise levels in practicing this invention, it was found that two successive threshold crossings would signify the start of a potentially valid pulse. Therefore if the next cycle of carrier also exceeds the pre-set threshold value, another logic "one" is shifted into the fly-wheel shift register 25, now it contains two logic "ones", and the tripping of the second flip-flop 51 signifies a potentially valid pulse. If, due to noise, the next, or any other, cycle of carrier, falls below the pre-set threshold, a logic "zero" will be clocked into the first location 50 of the up-down shift register, but the second flip-flop will still output a logic "one". If the next cycle of carrier exceeds the pre-set threshold, the shift register 25 once again counts upward such that two ones are again present, and the second flip-flop 51 still remains at a logic "one". This process of outputting a constant logic level out of the second flip-flop 51, even when noise prevents a cycle of the carrier to fall below the threshold level is defined as fly-wheel action. If two successive "zeros" are detected, the up-down shift register 25 will contain two "zeros" and the second flip-flop 51 will detect this state and will output a logic "zero" signifying the end of a potentially valid pulse.

A counter 54, reset and enabled by the aforementioned second flip-flop 51 in the fly-wheel logic 25, counts clock pulses generated by the previously described clock comparator during the so call fly-wheel action or potentially valid pulse period A decoder 55 connected to the counter 54 detects key counts representing specific key points along the "envelope" of an ideally shaped TACAN pulse. These logic signals and commands are:

a. T.O.A. at count of 8
b. Release Dump at count of 8
c. Switch from Track to Hold at count of 30
d. Check validity of outputted TOA by checking pulse width, i.e., pulse should end between count of 32 and 48
e. Output a pulse valid signal at count of 48
f. Output a start A/D conversion command at count of 48.

All these decoded outputs except items b and c feed other parts of the TACAN signal processor which are not part of this invention and will therefore not be described in detail. Items b & c, the Dump release and the Track/Hold command determine the mode of operation of the peak detector/sampler circuit.

The function of the peak detector/sampler circuit is to record the peak amplitude of the pulse-amplitude modulated carrier and hold it as a d.c. voltage for subsequent analog to digital conversion and digital signal processing, the latter being not part of this invention. In operation, the peak detector/sampler, which is connected directly to the raw IF, is forced into a reset or Dump condition during the time when no pulse is present as determined by the aforementioned counter-decoder 49. If 8 "consecutive" cycles of carrier are counted the chances are good that a valid pulse is being received, hence, the Dump command is released and the Track mode is entered. During the next 21 cycles of carrier (8 through 29) the positive peaks of the pulse-amplitude modulated carrier are followed similar to that of a conventional video detector. By the count of 30, the theoretical peak of an ideal TACAN pulse should have occurred and, therefore, the Track mode is ended and the Hold mode entered as commanded by the previously cited counter-decoder 49. The Hold voltage (considered as d.c.) is proportional to the peak of the pulse-amplitude modulated carrier and is held for subsequent A/D conversion. At the end of the A/D process, the counter-decoder 49 is reset and thus the Dump mode is entered, and the signal conditioner awaits for next pulse-amplitude modulated signal to be detected.

General Operation of the Signal Conditioner

As the IF signal is applied to the circuit depicted in FIG. 2, the detecting apparatus 20 detects the IF signal, and, upon the presence of data signals at the IF output, the output of the comparator 22 provides data pulses. Clock pulses from the output of the delay circuit 29 clocks the data signals into the fly-wheel logic 25. The fly-wheel logic 25 operates in a digital manner to count the number of pulses from the IF signal since it is known that the IF signal is produced at a fixed known IF frequency, such as, for example, 8.5 meaghertz. At specific timed intervals, a Dump signal, a Track/Hold signal, a time of arrival (TOA) signal, and Start Conversion signals are generated. When the pulse is properly generated, has the proper time duration, and otherwise meets all qualifications of a valid TACAN pulse, at the conclusion thereof a TOA valid signal is produced indicative of the fact that such TACAN signal had been received. Meanwhile, the Dump signals and Track/Hold signals have been provided to the sampled pulse peak detector 100.

The sampled pulse peak detector 100 has, as a primary function, the determination of the magnitude of the TACAN signal. This is achieved by receiving the IF signal, and, at the cessation of the Dump signal, the detector 100 measures the magnitude of the IF signal and, upon receipt of the Track/Hold signal, stores the signal therein. When it is desired to couple the signal from the sampled pulse peak detector 100 to the analog to digital converter, the Start Conversion signal from the fly-wheel logic 25 of the detecting apparatus 20, applied to the analog to digital converter 30, causes the sampled signal from the detector 100 to be encoded. The analog to digital converter 30 operates in a standard manner, as is well known in the art.

The comparator 27, is referenced to zero and acts as a clock generator, making transitions each time the input signal crosses zero. The comparator 22, the data generator, is biased, preferably, just above the noise threshold, and therefore, detects when the 8.5 MHz carrier amplitude exceeds the preset threshold. The time of arrival information is determined by counting a fixed number of "consecutive" data threshold crossings (e.g., eight) using the clock comparator 27, delayed by a quarter cycle of the 8.5 MHz carrier, as the data strobe. The resolution of this scheme is $\pm 118$ nanoseconds or, in terms of distance, $\pm 59$ feet. The comparators 22, 27, for all practical purposes, see fast 8.5 MHz fixed rise times.

Since noise causes erroneous false alarms and false dismittal data errors, digital filtering of the data output is mandatory. The filtering mechanism, desirably, is a simple digital fly-wheel logic 25 which both reject erroneous single threshold crossing false alarms, and ignores a false dismissal (missing) threshold crossing when two consecutive pulses were previously detected.

The counter-decoder 49 checks that the TACAN pulse has the correct width or duration, for example, 3.5 microseconds $\pm 1$ microsecond. If not correct, the pulse is rejected by the logic circuit 49. Further, the logic circuit issues a sample command at the theoretical peak of the pulse at the twentieth threshold crossing of the IF signal, and issues a TOA valid pulse at a fixed time after the first threshold crossing, e.g., 48 clock times later.

The Time of Arrival Detecting Apparatus

Figure 3A:
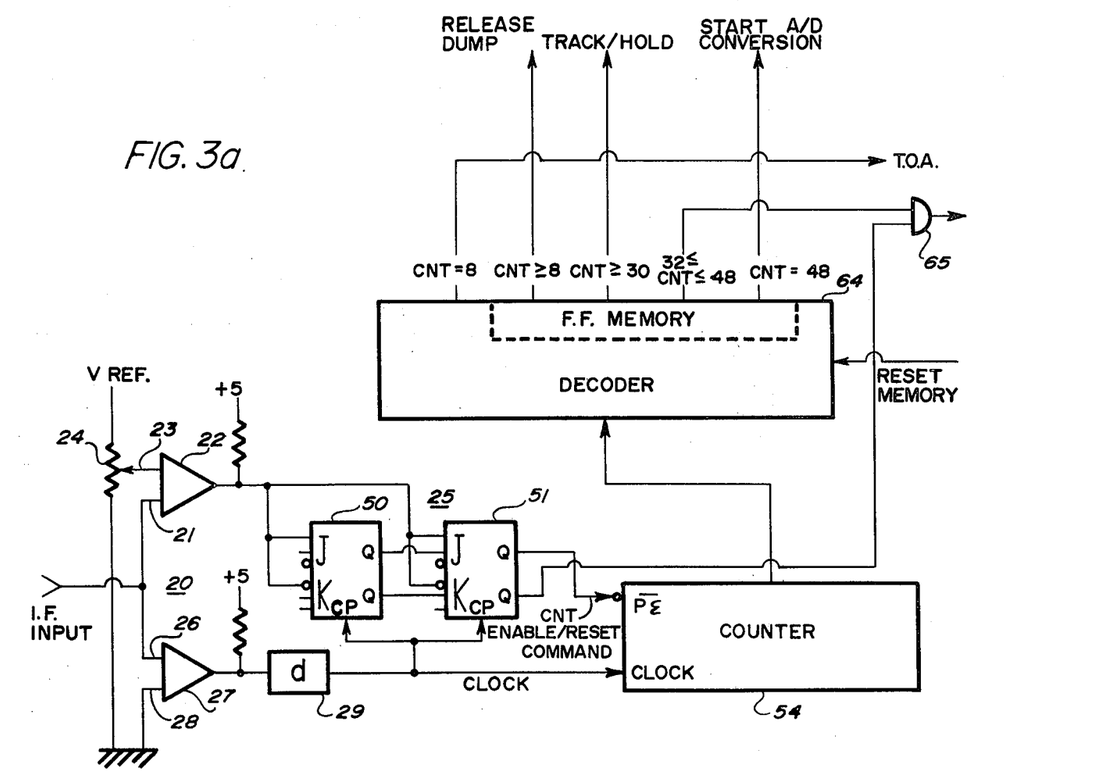
FIGS. 3a and 3b are detailed schematics of all three sub parts of the time of arrival detector, i.e., the comparator sensors, the up-down shift register fly-wheel, and the counter-decoder.
Figure 3B:
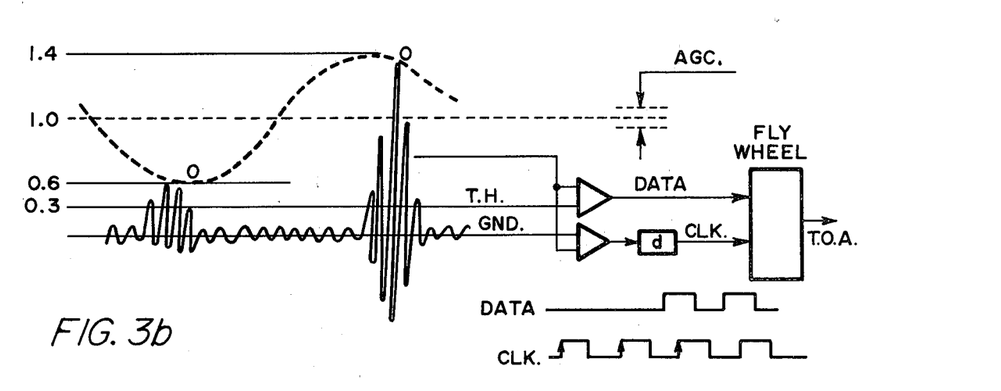

Referring to FIG. 3, there is shown, in block diagram, the time of arrival detecting apparatus 20. The time of arrival detecting apparatus 20 includes the comparators 22 and 27. The IF signal is coupled both to one terminal 21 of the comparator 22, and to one terminal 26 of the comparator 27. The other terminal 23 of the comparator 22 is coupled to a voltage divider 24 so as to receive a threshold voltage thereon. The voltage divider 24 is coupled across a source of positive voltage $+V$, and a point of reference potential, such as ground, so that a positive threshold value voltage is applied to the input 23 of the comparator 22. The other terminal 28 of the comparator 27 is coupled to a point of reference potential, such as ground. The output of the comparator 22 provides data pulses therefrom. The output of the comparator 27 applies a clock signal therefrom via a delay 29 having a nominal delay of 29 nanoseconds.

The value of the delay, ideally, is one quarter of the carrier period, more specifically, in the case of an 8.5 megahertz carrier, is equal to ¼ $1/8.5 \times 10^6$ seconds, which is equal to $29 \times 10^{-9}$ seconds or 29 nanoseconds.

The outputs of the comparator 22 and the delay 29 are coupled to the fly-wheel logic 25.

The fly-wheel logic 25 includes two JK flip-flops 50, 51 which together form a two stage up-down shift register 52.

Each of the JK flip-flops 50, 51 are standard, commercially available devices which operate in known manner. Further description thereof is not deemed necessary to an understanding of this invention.

Operation of Time of Arrival Detecting Apparatus

Sensing

The sensing circuits 22, 27 of the TOA detector 20 are commercially available comparators such as the LM 106 types sold by the National Semiconductor Corporation. The IF signal is inputted to the non inverting inputs of both comparators 22, 27 on terminals 21, 26 respectively. Comparator 22, the data generator, has its second input terminal 23 biased to a slight positive voltage potential generated by a resistive voltage divider 24 while comparator 27, the clock generator, has its second input terminal 28 biased to ground or zero potential. The operation of each comparator is as follows:

Whenever the inputted IF signal exceeds the respective comparator threshold bias potential, the comparator outputs a logic "1"; whenever the input IF signal falls below the threshold, the comparator outputs a logic "0". Since the number of "consecutive" IF carrier cycles that exceed the data threshold voltage is required to determine the TOA, a means to record the consecutiveness is required. This means is accomplished by using the clock comparator 27, which makes output logic transitions each time the symmetric about ground IF carrier signal changes polarity. So as to provide the clock strobe at the peak of the IF carrier, the clock generator comparator output is delayed by approximately 90 degrees when referred back to the input carrier. Since the IF frequency for all practical purposes is a constant (8.5 MHz) for this application, the 90 degree delay is performed in a fixed 29 nanoseconds delay line circuit 29.

Fly-wheel

So as to reject noise, an up-down shift register 52 and "OR" gate act as a digital fly-wheel 25. The fly-wheel 25 receives the aforementioned data and clock strobe on terminals 48, 49, respectively, and outputs a logic signal which signifies the absence (logic "O") or presence (logic 1) of a potentially valid pulse-amplitude modulated TACAN pulse.

The 2 bit up-down shift register fly-wheel 25 includes two identical multi-input, positive edge triggered JK flip-flops 50, 51, such as types SN 7470, sold by the Texas Instrument Corporation, where $$J = J_1 \cdot J_2 \cdot \bar{J}_3$$

$$K = K_1 \cdot K_2 \cdot \bar{K}_3$$

as represented in blocks 50, 51 of FIG. 3. The pertinent truth table for this particular type flip-flop is:

Truth Table

| Condition | J | K | Clock | Q | $\bar{Q}$ |
|---|---|---|---|---|---|
| a | 0 | 0 | ⌐ | No change | |
| b | 1 | 0 | ⌐ | 1 | 0 |
| c | 0 | 1 | ⌐ | 0 | 1 |
| d | 1 | 1 | ⌐ | Toggle | |

In operation, during the inter pulse period (no pulse present, only carrier), the data line will essentially always be a logic "0" and the Q outputs of the flip-flop 50, 51 will be clocked to logic zeros because the net effect of the multi-input J-K gating will be equivalent to truth table condition c.

As a pulse begins to emerge, even if it is a spurious noise cycle of carrier false start, flip-flop 50 has its J-K input gating changed from condition c to b by the logic 1 present on the data line and thus changes state when the clock pulse arrives. Flip-flop 51, gated at the time of the clock pulse, remains at condition c and therefore does not change state.

If upon the next clock pulse, the data line is a logic zero, it is assumed that the previous clock pulse processed a spurious noise cycle of carrier and thus flip-flop 50 is clocked back to a logic zero, and flip-flop 51 is left at its last logic zero state.

If, on the other hand, the next clock pulse samples the data line, and it is a logic 1 again, flip-flop 50 remains a logic one, and flip-flop 51 flips to a logic one signifying the start of a potentially valid pulse because the truth table condition b will be true at the J-K inputs of both flip-flops 50, 51 just prior to this second clock pulse. Condition b J-K gating will remain at the inputs of both flip-flops 50, 51 as long as successive cycles of the carrier exceed the data threshold.

Once two or more successive IF cycles have exceeded the data threshold, one cycle of the carrier is allowed to fall below the data threshold, without effecting the state of the second flip-flop 51 (fly-wheel action) for when the clock pulse arrives, the net J-K gating on flip-flop 51 will be that of truth table condition a. The first flip-flop 50 will, of course, change state because the net J-K gating on it would have been that of truth table condition c.

If, on the next clock pulse, the data line is once again a logic one, the first flip-flop 50 will be commanded per condition b and the second flip-flop 51 will stay commanded per condition a and once again both flip-flops 50, 51 will be gated to a logical 1 state when the clock arrives, thus performing the fly-wheel function.

If, on the other hand, two successive data zeros, as determined by the data comparator 22, are clocked into shift register 25, the net J-K gating to the second flip-flop 51 at the second clock time will be that of condition c, and both flip-flops 50, 51 once again will be clocked to the zero state.

Counter Decoder

The counter-decoder 54–55 counts the number of fly-wheeled clock pulse cycles that exceed the data threshold as determined by the state of the second flip-flop 51 in the fly-wheel logic section. As long as Q is a logical zero and the counter 54 receives clock pulses, the counter 54 remains in its pre set all zero state. As soon as two consecutive threshold crossings are clocked into the fly-wheel 25, the Q output changes to a logical 1 enabling the counter 54 to begin to count clock pulses. As the counter 54 counts up from zero to 8, at which time the decoder 55 outputs a TOA logic signal signifying that the 50% point of an ideally shaped pulse should have reached that level, the decoder 55 releases the Dump command such that the capacitor 133 voltage in the peak detector/sampler circuit 100 follows the peaks of the carrier. Since the Dump command must stay released for the entire count sequence, and then some (until reset by completion of the A/D process), a flip-flop (memory) 64 is set at the count of 8 which stays set until reset by the A/D end of conversion command. Likewise, as the counter 54 continues to count past the counts of 30, 32, 48, other flip-flops of the memory 64 get set resulting in commands Track-/Hold, 48 ≥ cnt ≥ 32, sample A/D. A pulse is considered as valid if it is of a particular width. The width function is tested by gate 65. The logic is as follows:

if the pulse goes away between the count of 32 and 48 the $\overline{Q}$ output of the fly-wheel 25 will return to a logic 1 and a pulse will be outputted from the gate 65 signifying that the pulse was a valid one.

Operation of the Peak Detector/Sampler

Raw IF carrier cycles, FIG. 1a, are inputted to one terminal of a differential amplifier 105, FIG. 2 and current gain stage. During interpulse periods (no pulse present), the Dump command electronically shorts the memory capacitor 133 shown in FIG. 2, and thus the output line is essentially grounded. When the Dump command is released (count of 8), the capacitor 133 tries to charge up to each successive positive peak of the carrier by pumping current into the capacitor 133 whenever the IF carrier input exceeds the buffered capacitor feed back voltage as determined by the input differential amplifier stage 105. The closed loop pulling process continues until the theoretical peak of the pulse-amplitude modulated carrier has passed (count of 30) at which time the Track command is switched to the Hold mode. Electronic switch S1 switches from closed to open, disabling any more current from charging the capacitor 133. The held and buffered capacitor voltage is outputted to an analog to digital converter 30 where it is converted to a digital number for additional signal processing which is not part of this invention.

Details of the Peak Detector/Sampler

Figure 4:
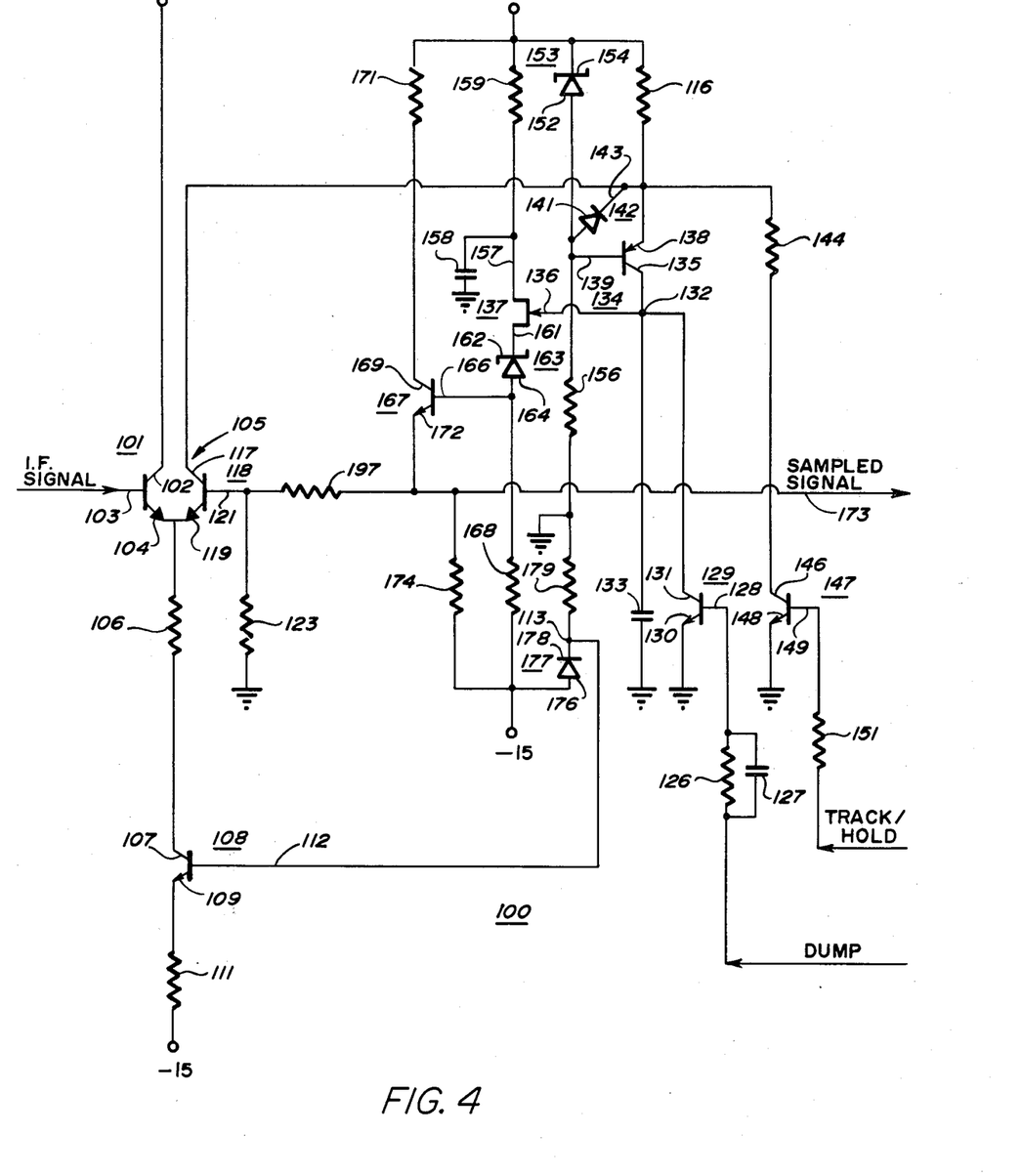
FIG. 4 is a detailed schematic of the amplitude pulse peak detector/sampler circuitry.

The schematic parts of the peak detector/sampler shown in FIG. 4 can be related to the parts of the block diagram in FIG. 2 as follows:

| FIG. 2 | FIG. 4 |
|---|---|
| input differential amplifier | transistors 101 & 118 |
| current gain stage | transistor 134 |
| memory capacitor | capacitor 133 |
| output buffer | Fet 137, Zener diode 163 transistor 167 |
| Dump release switch | transistor 129 |
| Track/Hold switch | transistor 147 |
| closed loop gain adjust | resistor 123 & 197 |

All other components are required to set up bias and quiescent operating conditions of the circuit.

In operation, the sampled pulse peak detector of this invention follows the input carrier by charging up to the peaks of the input carrier signal and holding the stored charge, without discharging as in the priot art.

Referring to FIG. 4, when the Dump signal is positive, or high, which occurs during the first eight cycles of the input signal, but not at the eighth count of the counter 54, the base 128 of the transistor 129 becomes positive with respect to the emitter 130, causing the transistor 129 to conduct. Thus, any charge on the storage capacitor 133 is dissipated through the transistor 129 and is effectively shunted to ground. Hence, in the presence of the positive Dump signal, no charge is stored on the storage capacitor 133, and the capacitor 133 does not follow the signal applied to the transistor 101. The signal applied on the output line 173 is at zero volts.

The action of the transistor 108 with its base 112 coupled via the junction 113 through the resistor 179 to ground, and its emitter 109 coupled to a point of negative potential, is such as to cause a constant current to flow through the resistor 106.

When the Dump signal is absent, or when the voltage applied to the base 128 is a logic 0, the transistor 129 becomes non-conductive, thus permitting storage of charges on the storage capacitor 133. The removal of the Dump signal causes the circuit, including the Fet 137, the transistor 167, and the associated components, to act as a closed loop amplifier. The transistor 118 tends to charge up to the same voltage as that applied to the transistor 101. That is, the voltage on the base 121 tends to be equal to the voltage applied to the base 103. Hence, when a millivolt is applied to the base 103 a millivolt will be applied to the base 121, as follows:

If the IF signal on the base 103 tends to go high, the transistor 101 conducts, which tends to cut off the transistor 118 by biasing the emitter 119 in a positive direction in view of the constant current flowing through the resistor 106. Therefore, as the transistor 118 tends to cease conduction, its collector 117 tends to become more positive.

As the collector 117 of the transistor 118 becomes more positive, the transistor 134 tends to increase in conduction since its emitter 138 is at a higher voltage level than previously, thereby charging the storage capacitor 133.

As the storage capacitor 133 charges positively, the increased positive charge is applied to the gate 136 of the Fet 137. Hence, the output applied to the drain electrode 161 of the Fet 137 increases, since that portion of the circuitry operates as a Fet follower. The Zener diode 163 operates as a level shifter, which shifts the signal down. As the signal increases, the emitter 172 of the transistor 167 likewise increases, thereby changing the input signal to the transistor 118 of the input differential pair 101, 118 positive, thereby tending to approach what the input signal was on the base 103. This process continues until the voltage at the base 121 equals the voltage at the base 103. Were the voltage on the base 121 to tend to increase higher than that at the base 103, then the transistor 118 would tend to increase conductivity to a higher degree, and thereby tend to reduce the current and cut off the transistor 101, and, if such occurred, the capacitor 133 would cease conduction, thereby stopping this voltage increase at the base 121.

In other words, as the input signal applied to the transistor 101 goes positive, the transistor 118 by virtue of the closed loop amplifier circuit tends to follow the positive peaks of the input signal. When the signal at the base 121 of the transistor 118 approaches the peak of the pulse applied to the transistor 101, the sinusoidal input signal applied to the transistor 101 starts to go negative. When that occurs, the transistor 101 gets turned off, whereby the transistor 118 would conduct. When the transistor 118 conducts, the transistor 134 cuts off. When the transistor 134 cuts off, the capacitor 133 does not charge, or change, so that the capacitor 133 holds the peak voltage that it had just sampled. The capacitor 133 holds such voltage until the input signal again increases and goes above where it was previously. When the input transistor 101 increases above its previous positive peak, the transistor 118 again cuts off, thereby turning on the transistor 134, permitting the capacitor 133 to again charge. The capacitor 133 charges to the value of the peak of the input signal applied to the transistor 101. It does not exceed the peak of the input signal, since the transistor 118 would then conduct and shut off the further charging up of the capacitor. As the IF signal swings negatively, during its various cycles of carrier, the transistor 101 ceases conduction, and, hence, due to the constant current being drawn through the resistor 106, causes the transistor 118 to conduct to a greater degree, thereby lowering the voltage at the collector 117. As the voltage on the collector 117 diminishes, the voltage applied to the emitter 136 of the transistor 134 diminishes, tending to turn off the transistor 134. As the transistor 134 is turned off, however, the charge stored on the storage capacitor 133 is unaffected. As the IF signal again becomes positive, the storage capacitor tends to charge if the IF signal becomes more positive than that heretofore.

At the 8th cycle of the input signal, and hence, the 8th count of the counter 54, the Track/Hold signal becomes positive, turning on the transistor 147. When the transistor 147 is turned on, it, in effect, shunts or turns off the transistor 134, regardless of what the input signal at the base 103 of the transistor 101 is doing, or regardless what the input tends to instruct the transistor 134 to do. The transistor 134 is turned off completely, and when the transistor 134 is turned off, the capacitor 133 can no longer change value, even if the input signal applied to the base 103 of the transistor 101 exceeds its previous value. Thus, the capacitor 133 holds its last known voltage, which should be equivalent to the voltage at the last peak of the IF signal. The held voltage is effectively a DC voltage effect which can be held effectively for a long time regardless of what is happening at the input 103 of the transistor 101. The stored charge on the capacitor 133, upon the presence of the Track/Hold signal is, in effect, isolated from any further variation in the IF signal applied to the base 103 of transistor 101, Hence, with the presence of the Track/Hold signal, as the IF signal has other variations applied thereto, or other signal applied to the transistor 101, no effect is had upon the charge stored in the capacitor 133 because the transistor 134 is effectively turned off by the Track/Hold signal.

The charge on the storage capacitor 133, being applied to the gate 136 of the Fet 137, in effect, controls the signal applied to the transistor 167 to determine the sampled signal along the line 173. The charge does not tend to leak off or bleed off, due to the capacitor 133 being coupled to a high impedance circuit. The input of a Fet, such as the Fet 137, is on the order of $10^{10}$ ohms, and the input of a collector, such as the collector 135 of the transistor 134, is on the order of 500 kilohms. Thus, the effective shunt resistance across the capacitor 133 is on the order of 500 kilohms or better. Hence, a charge stored on a 100 picofarad capacitor, such as is typical for the capacitor 133 does not leak off while the circuit is in the Hold mode. The charge on the capacitor tends to keep its last known value for comparatively long periods of time, that is, long compared to the time that it takes the analog to digital converter to perform an analog to digital conversion.

The voltage at the capacitor 133 is effectively coupled to the line 173. Though it is not equal to it, it is proportional. The capacitor voltage is normally slightly more positive than the actual output voltage since there may be as much as a seven volt drop across a Zener diode 163 depending on the pinch off voltage at the Fet. The output signal on the line 173 is however exactly equal to the peak of the signal and at a low impedance output, since the signal applied on the line 173 is being applied from an emitter follower, via the emitter 172 of the transistor 167. Hence, the output signal has a low source impedance to drive the remainder of the circuitry, such as the analog to digital converter 30 (FIG. 2).

To avoid the undesired effects of noise, rate limiting, well known to the art, is used. The capacitor circuit can only follow the signal that is applied to the input so that it does not overshoot and follow spikes of noise. With rate limiting, or filtering, a detective function is performed.

The signal stored on the capacitor 133 is designed to remain for a period of 60 microseconds, thus blocking the second pulse of the doublet from affecting the held voltage.

Other variations may be performed within the scope of this invention without departing from its teachings, as, for example, by using different intermediate frequencies other than 8.5 megahertz, and by utilizing other obvious variations, using, for example, N type transistors instead of P type, and using devices other than a Fet, or for that matter, using other types of electronic discharge devices, such as integrated circuits. Such substitutions are obvious, it being desired that this invention be construed broadly to cover the means for performing same as set forth, for example, in the appended claims as filed.

What is claimed is:

1. Apparatus for detecting the time of arrival of a signal, wherein said signal is transmitted and received in the form of a plurality of cycles of amplitude modulated radio frequency which is modulated with a square wave pulse having a known rise time $t$ and a known duration $d$, including an R.F. reciever for receiving said amplitude modulated radio frequency, a tunable local oscillator circuit for beating with an output of said R.F. receiver for producing an IF signal of a fixed frequency $f$, and at least one IF stage for amplifying said IF signal, the improvement comprising a. means coupled to one of said IF stages for counting a fixed number n of cycles of the intermediate frequency signal coupled thereto, wherein $n$ is a function of both one-half of the rise time $t$ and of the frequency $f$.

2. Apparatus as recited in claim 1 wherein $f = 8.5$ megacycles per second, $t = 2.5$ microseconds and $n = 8$.

3. Apparatus for detecting the time of arrival of a signal, wherein said signal is transmitted and received in the form of a plurality of cycles of amplitude modulated radio frequency which is modulated with a square wave pulse having a known rise time $t$ and a known duration $d$, including an R.F. receiver for producing an IF signal of a fixed frequency $f$, and at least on IF stage for amplifying said IF signal, the improvement comprising:
  a. means coupled to one of said IF states for counting a fixed number $n$ of cycles of the intermediate frequency signal coupled thereto, wherein $n$ is a function of both one-half of of the rise time $t$ and of the frequency $f$, said means comprising:
    1. a first comparator having one input coupled to said one of said IF stages and another input coupled to a point of reference potential so as to produce a pulse at the output thereof whenever a cycle from said one of said stages exceeds said point of reference potential;
    2. means coupled to the output of said first comparator for delaying the square wave output pulse, so that the delayed pulses becomes a clock pulse;
    3. a second comparator having one input coupled to said one of said IF stages and another input coupled to a positive threshold voltage so as to produce a data pulse at the output thereof whenever a cycle from one of said stages exceeds said threshold voltage; and
    4. logic circuitry means coupled to the output of said second comparator for counting n data pulses, said logic circuitry being clocked by clock pulses from said means.
4. Apparatus as recited in claim 3 wherein said logic circuitry means includes
  i. a two-stage up-down shift register coupled to receive pulses, said shift register being clocked by successive said clock pulses;
  ii. a gate circuit, coupled to the output of said shift register, for producing an output logic "1" level therefrom upon the coincidence of a data pulse with a clock pulse at said shift register,
  iii. means for rejecting single data pulse threshold crossings by shifting down when a next data pulse is missing and by gliding past a missing pulse when two or more successive threshold crossings are detected,
  iv. a counter coupled to the output of said gate circuit, and controlled by said gate circuit, for producing a signal when said counter counts to $n$ thereby indicating the arrival of one-half of the amplitude of said IF pulse.
5. The apparatus as recited in claim 1 wherein said means (a) further counts a fixed number N of cycles of the intermediate frequency signal coupled thereto, wherein N is a function of both the duration $d$ and of the frequency $f$.
6. The apparatus as recited in claim 4 wherein said counter (iv) further produces a signal when said counter counts to N, wherein N is a function of both the duration $d$ and the frequency $f$, thereby indicating the completion of said square wave pulse.
7. The apparatus as recited in claim 6 further comprising (v) means coupled to said counter for producing a TOA signal after said counter has counted to N, but a clock cycle later has failed to count to N+1.
8. In a TACAN receiver, a circuit for receiving a modulated square wave pulse, modulated at an intermediate frequency, and for storing the peak value of such pulse at a particular time, and circuit comprising
  a. a first transistor having
    a collector adapted to be coupled to a voltage source,
    a base coupled to receive said modulated square wave pulse, and an emitter;
  b. a second transistor of the same conductivity type as said first transistor, said second transistor having
    a collector,
    a base, and
    an emitter coupled to said first transistor emitter;
  c. a constant current path means for coupling said emitters to a point of reference potential of opposite polarity to that of said voltage source;
  d. a first resistor for coupling said voltage source to said second transistor collector;
  e. a third transistor having a conductivity type opposite to that of said first and said second transistors, said third transistor having
    a collector,
    a base, and
    an emitter coupled to said second transistor collector;
  f. a storage capacitor having one terminal thereof coupled to said third transistor collector, and having a second terminal thereof coupled to a point of reference potential;
  g. a first electronic circuit means for receiving a signal to selectively maintain said storage capacitor in a discharged condition, or to permit said storage capacitor to be unaffected thereby, said first circuit means being coupled to said storage capacitor one terminal;
  h. a second electronic circuit means for receiving a signal at said particular time for holding the charge stored on said capacitor, said second electronic circuit means including a fourth transistor having the same conductivity type as said first and said second transistors, and having
    a collector coupled to said third transistor emitter,
    a base coupled to receive said holding signal, and
    an emitter coupled to a point of reference potential;
  i. a third electronic circuit means, having at least one electronic discharge device therein, for coupling to said second transistor base; and
  j. a fourth electronic circuit means having a high impedance path for coupling said storage capacitor one terminal to said third electronic circuit means, whereby said third electronic circuit means provides an output signal indicative of the stored peak value of said pulse.
9. The circuit as recited in claim 8, wherein said third and said fourth electronic circuit means includes
  1. a first resistive device for coupling said second transistor base to a point of reference potential;
  2. an electronically controlled attenuator having a first terminal, and a second terminal coupled to said second transistor base;
  3. a fifth transistor of said same conductivity type having
    a collector resistively coupled to said voltage source,
    a base, and
    an emitter coupled to said first terminal of said electronically controlled attenuator;
  4. a serially connected resistive and capacitive means, said resistive means being coupled to said voltage source, and said capacitive means being coupled to a point of reference potential;
  5. a field effect transitor having a source electrode coupled to the common connection of said resistive and capacitive means,
a gate electrode coupled to said one terminal of said storage capacitor, and
a drain electrode;
6. a second resistive device for coupling said base of said fifth transistor to a point of reference potential of opposite polarity to that of said voltage source; and
7. a Zener diode having
an anode coupled to said fifth transistor base, and
a cathode coupled to said drain electrode.

10. In a TACAN receiver, apparatus for measuring the time of arrival of a TACAN received signal and for storing the peak value of an intermediate frequency modulated square wave pulse, at a particular time, said receiver having an intermediate frequency stage, said apparatus comprising a. a first comparator having one input coupled to said intermediate stage, and another input coupled to a point of reference potential so as to produce a square wave output pulse at the output thereof whenever the output of said stage exceeds said point of reference potential;
b. means coupled to the output of said first comparator for delaying the square wave output pulse, for half the time period of said square wave pulse, so that the delayed pulse becomes a clock pulse;
c. a second comparator having one input coupled to said intermediate frequency stage, and another input coupled to a positive threshold voltage so as to produce a square wave data pulse at the output thereof whenever the output of said stage exceeds said threshold voltage;
d. a two stage up-down shift register coupled to receive successive data pulses, said shift register being clocked by said clock pulses;
e. a gate circuit, coupled to the output of said shift register, for producing an output therefrom upon the coincidence of a data pulse with a clock pulse at said shift register, following the successive occurrence of two adjacent data pulses and clock pulses;
f. a counter coupled to the output of said gate circuit, and controlled by said clock pulses, for producing a first signal when said counter counts to a first predetermined number indicative of the number of cycles of intermediate frequency that takes place during one half of the rise time of said square wave modulated pulse; said counter further producing a second signal when said counter counts to a second predetermined number during the peak value of said pulse and thus at said particular time; and said counter further producing a third signal at a third predetermined number, which third signal indicates the completion of said square wave pulse;
g. a first transistor having
a collector adapted to be coupled to a voltage source,
a base coupled to said intermediate frequency stage, and
an emitter;
h. a second transistor of the same conductivity types as said first transistor, said second transistor having
a collector,
a base, and
an emitter coupled to said first transistor emitter;
i. a constant current path means for coupling said emitters to a point of reference potential of opposite polarity to that of said voltage source;
j. a first resistor for coupling said voltage source to said second transistor collector;
k. a third transistor having a conductivity type opposite to that of said first and said second transistors, said third transistor having
a collector,
a base, and
an emitter coupled to said second transistor collector;
l. a storage capacitor having one terminal thereof coupled to said third transistor collector, and having a second terminal thereof coupled to a point of reference potential;
m. a first electronic circuit means for receiving said first signal to selectively maintain said storage capacitor in a discharged condition, or to permit said storage capacitor to be unaffected thereby, said first circuit means being coupled to said storage capacitor one terminal;
n. a second electronic circuit means for receiving said second signal at said particular time for holding the charge stored on said capacitor, said second electronic circuit means including a fourth transistor having the same conductivity type as said first and said second transistors, and having
a collector coupled to said third transistor emitter,
a base coupled to receive said holding signal, and
an emitter coupled to a point of reference potential;
o. a first resistive device for coupling said second transistor base to a point of reference potential;
p. an electronically controlled attenuator having a first terminal, and a second terminal coupled to said second transistor base;
q. a fifth transistor of said same conductivity type having
a collector resistively coupled to said voltage source,
a base, and
an emitter coupled to said first terminal of said electronically controlled attenuator;
r. a serially connected resistive and capacitive means, said resistive means being coupled to said voltage source, and said capacitive means being coupled to a point of reference potential;
s. a field effect transistor having
a source electrode coupled to the common connection of said resistive and capacitive means,
a gate electrode coupled to said one terminal of said storage capacitor, and
a drain electrode;
t. a second resistive device for coupling said base of said fifth transistor to a point of reference potential of opposite polarity to that of said voltage source; and
u. a Zener diode having
an anode coupled to said fifth transistor base, and
a cathode coupled to said drain electrode, whereby said first terminal of said electronically controlled attenuator provides an output signal indicative of the stored peak value of said pulse, and
said first signal from said counter determines the time of arrival of a TACAN pulse, when said third signal from said counter indicates that a TACAN signal has been properly received.

11. Apparatus for detecting and extracting time and amplitude information from a fixed rise time, pulse-amplitude modulated carrier as is found in a typical TACAN receiver at the last intermediate frequency stage, said apparatus comprising:
   a. time of arrival detecting means including
      1. comparator sensing means operating directly on the raw IF signal from said last stage,
      2. up-down shift register fly-wheel logic means for rejecting erroneous false alarm and false dismissal errors, and
      3. counter-decoder logic means for counting the number of "consecutive" cycles of carrier that exceed a predetermined noise threshold, and for outputting various commands to other circuits of said receiver; and
   b. peak amplitude detecting/sampling means including
      1. differential amplifier and current gain stage means,
      2. memory capacitor means,
      3. a Fet buffering stage, and
      4. logic controllable Dump and Track/Hold mode control means.

12. Apparatus as recited in claim 11 wherein said means a-1 comprises
   a. a first comparator data generator means having one input coupled to said IF stage and having a second input coupled to a point of reference potential other than ground,
   b. a second comparator clock generator means having one input coupled to said IF stage and having a second input coupled to a point of reference potential equal to ground, and
   c. delay line means coupled to an output of said clock generator comparator means for delaying the leading edge of a clock pulse by 90 C relative to the raw IF carrier so as to produce a strobe at the peak of the carrier.

13. Apparatus as recited in claim 11 wherein said means a-2 comprises:
   two multi-input J-K edge triggered flip-flops means applied to the data comparator output and the delayed clock output, whereby said flip-flops are connected as an up-down shift register to provide fly-wheel action.

14. Apparatus as recited in claim 11 wherein said means a-3 comprises:
   a. an electronic counting means,
   b. gating means for detecting and decoding specific counts, and
   c. flip-flop memory means for storing said specific counts and for providing command signals therefrom.

15. Apparatus as recited in claim 11 wherein said means b-1 comprises:
   a differential match pair of transistors and associated current source therefore, said transistors being arranged in a cascade connected current gain arrangement and connected in a common base configuration.

16. Apparatus as cited in claim 11 wherein said memory capacitor means b-2 is so coupled
   a. in a high impedance circuit for good charge/hold time ratios,
   b. in such closed manner so as to provide the dominent pole in the transfer function for stability purposes,
   c. in a manner to provide capability of meeting the desired slow rate compatable with the high frequency 8.5 MHz carrier,
   d. in a manner so as to be easily isolated from the input by external electrical Track/Hold command, and
   e. in a manner so as to be easily reset or dumped by an external Dump command.

17. Apparatus as recited in claim 11 wherein said means b-3 comprises:
   a. a Fet buffering stage with a high input impedance so as not to discharge said memory capacitor during the Hold mode,
   b. a non critical Zener diode level shifting circuit to account for the pinch-off voltage of the Fet, and
   c. an emitter follower circuit to provide a good low driving source impedance.

18. Apparatus as recited in claim 11 wherein said means b-4 comprises:
   a. level shifting low leakage Dump transistor to interface the logic signal levels to those required by the detector/sampler
   b. level shifting Track/Hold transistor to interface the logic level signals to those required by the detector/sampler.

19. Apparatus according to claim 1 wherein said receiver is a TACAN receiver.

* * * * *